(12) United States Patent
Bartha et al.

(10) Patent No.: US 10,443,301 B2
(45) Date of Patent: Oct. 15, 2019

(54) THIEF HATCHES WITH DIAPHRAGM ASSISTED SEALING

(71) Applicant: Emerson Process Management Regulator Technologies Tulsa, LLC, Tulsa, OK (US)

(72) Inventors: Istvan Bartha, Odorheiu-Secuiesc (RO); Cristian Amza, Cluj-Napoca (RO); John Cockerham, Tulsa, OK (US); Vlad Cristinel Hanceanu, Apahida (RO); Silviu Vasile Rebreanu, Cluj-Napoca (RO)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 173 days.

(21) Appl. No.: 15/470,526

(22) Filed: Mar. 27, 2017

(65) Prior Publication Data

US 2018/0274284 A1    Sep. 27, 2018

(51) Int. Cl.
| | | |
|---|---|---|
| *F16K 17/26* | (2006.01) | |
| *E06B 7/16* | (2006.01) | |
| *F16J 15/02* | (2006.01) | |
| *E06B 3/38* | (2006.01) | |
| *B60K 15/035* | (2006.01) | |
| *B65D 90/34* | (2006.01) | |
| *F16J 13/18* | (2006.01) | |

(52) U.S. Cl.
CPC .............. *E06B 7/16* (2013.01); *B60K 15/035* (2013.01); *B65D 90/34* (2013.01); *E06B 3/38* (2013.01); *F16J 13/18* (2013.01); *F16J 15/02* (2013.01); *Y10T 137/778* (2015.04); *Y10T 137/7777* (2015.04)

(58) Field of Classification Search
CPC .... B65D 90/34; F01P 11/0238; F16K 17/196; Y10T 137/7777; Y10T 137/778
USPC ........................................ 220/203.24, 203.26
See application file for complete search history.

(56) References Cited

U.S. PATENT DOCUMENTS

| | | | | |
|---|---|---|---|---|
| 1,585,512 A | * | 5/1926 | Roades ................... | B65D 90/34 |
| | | | | 137/493.9 |
| 1,645,722 A | * | 10/1927 | Gwynne .................. | F16K 24/00 |
| | | | | 137/493.5 |
| 2,183,448 A | | 12/1939 | Drane | |

(Continued)

FOREIGN PATENT DOCUMENTS

GB        1175875        1/1970

OTHER PUBLICATIONS

Enardo.com, "ES-660 Series Spring-Loaded Hatch," ES-660 Series Instruction Manual, Mar. 2015, 8 pages.

(Continued)

*Primary Examiner* — Robert K Arundale
(74) *Attorney, Agent, or Firm* — Hanley, Flight & Zimmerman, LLC

(57) ABSTRACT

Thief hatches with diaphragm assisted sealing are disclosed. An example apparatus includes a base attachable to a tank, and a cover attachable to the base via a hinge. The example apparatus further includes a vacuum seal assembly couplable to the cover, and a diaphragm coupled to a stem of the vacuum seal assembly. The diaphragm is moveable in response to a pressure differential between a first pressure within the tank and a second pressure exterior to the tank.

20 Claims, 3 Drawing Sheets

(56) References Cited

U.S. PATENT DOCUMENTS

| | | | | |
|---|---|---|---|---|
| 4,137,943 | A * | 2/1979 | Rath | B65D 90/34 |
| | | | | 137/586 |
| 4,953,583 | A * | 9/1990 | Szlaga | B60K 15/03519 |
| | | | | 137/118.02 |
| 5,246,034 | A * | 9/1993 | Higgins | F16K 17/10 |
| | | | | 137/587 |
| 9,296,530 | B2 | 3/2016 | Cockerham et al. | |
| 2001/0032849 | A1 * | 10/2001 | Martin, Jr. | B60P 3/2235 |
| | | | | 220/203.19 |
| 2008/0295893 | A1 * | 12/2008 | Bittner | F16K 17/196 |
| | | | | 137/116.3 |
| 2013/0264341 | A1 * | 10/2013 | Cockerham | B65D 90/105 |
| | | | | 220/203.29 |
| 2016/0236835 | A1 * | 8/2016 | Xiqing | B65D 90/34 |
| 2017/0074413 | A1 | 3/2017 | Cockerham | |
| 2018/0274677 | A1 * | 9/2018 | Bartha | F16J 13/16 |

OTHER PUBLICATIONS

Enardo Hatches, "Model ES-660 and ES-660-L, Thief Hatches," 2 pages.
International Searching Authority, "Search Report and Written Opinion," issued in connection with International Application No. PCT/US2018/023240, dated Jun. 14, 2018, 10 pages.

* cited by examiner

US 10,443,301 B2

THIEF HATCHES WITH DIAPHRAGM ASSISTED SEALING

FIELD OF THE DISCLOSURE

This disclosure relates generally to thief hatches and, more particularly, to thief hatches with diaphragm assisted sealing.

BACKGROUND

Thief hatches are hatches mounted to tanks or other fluid containing vessels that often serve the dual purpose of (1) providing access to the contents of such tanks or vessels to thieve or extract samples, measure levels, and/or take other measurements of the contents of the tanks or vessels, and (2) regulating the pressure within such tanks or vessels. Such hatches provide access to the contents of a tank by a cover or lid that may be pivoted about a hinge to an open position, thereby uncovering an aperture in the tank. Some thief hatches regulate pressure in a tank by releasing pressure when the tank pressure exceeds a high pressure threshold and introducing pressure into the tank when the tank pressure drops below a vacuum pressure threshold (e.g., a negative pressure threshold relative to the ambient atmosphere). When the tank pressure is between the high pressure threshold and the vacuum pressure threshold, seals in the closed hatch reduce (e.g., prevent) leakage of fluid out of the tank. While suitable to any application, such pressure regulating hatches are often implemented on tanks in which volatile and/or vaporizable liquids are stored, transported, or otherwise handled.

SUMMARY

Thief hatches with diaphragm assisted sealing are disclosed. An example apparatus includes a base attachable to a tank, and a cover attachable to the base via a hinge. The example apparatus further includes a vacuum seal assembly couplable to the cover, and a diaphragm coupled to a stem of the vacuum seal assembly. The diaphragm is moveable in response to a pressure differential between a first pressure within the tank and a second pressure exterior to the tank.

Another example apparatus includes a base attachable to a tank, and a cover pivotably coupled to the base via a hinge. The example apparatus further includes an actuator housing coupled to the cover. The example apparatus also includes a diaphragm disposed between the actuator housing and the cover. The diaphragm separates a first chamber within the actuator housing from a second chamber within the cover. A pressure differential between a first pressure in the first chamber and a second pressure in the second chamber is to produce a force urging a vacuum seal against a sealing surface.

Another example apparatus includes a base of a thief hatch attachable to a tank and a cover of the thief hatch attached to the base via a hinge. The example apparatus further includes a vacuum seal disposed within the thief hatch. The vacuum seal is to be urged against a sealing surface with a sealing force that includes a pressure force generated from a first pressure in the tank when the first pressure is above a second pressure in an ambient environment exterior to the tank. The vacuum seal is to let pressure into the tank from the ambient environment when a tank pressure is less than a vacuum pressure threshold. the example apparatus also includes means for providing a larger surface area on which the first pressure is applied to increase the sealing force.

Figure 1:
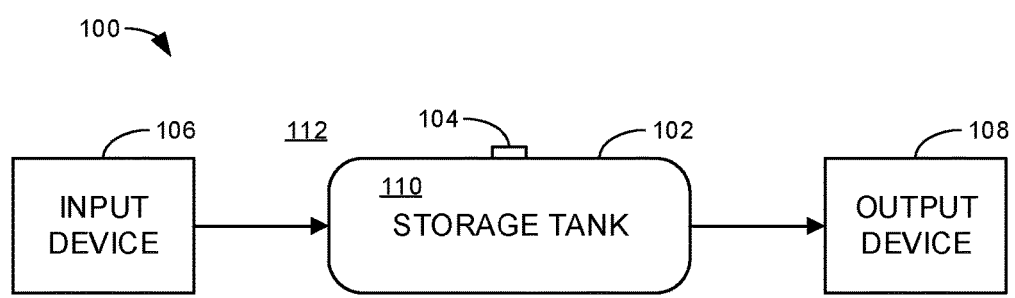
FIG. 1 is a schematic of a storage tank system having an example thief hatch constructed in accordance with the teachings disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Many thief hatches include a vacuum seal assembly and a pressure seal assembly that work in combination to seal off the aperture of a tank where the hatch is located when the tank pressure is within an acceptable range relative to an ambient environment (e.g., atmospheric pressure). If pressure within the tank exceeds an upper threshold above an ambient (e.g., atmospheric) pressure, the pressure seal assembly within the thief hatch is designed to break its seal to release some pressure within the tank. If pressure within the tank drops below a lower threshold below an ambient (e.g., atmospheric) pressure, thereby forming a vacuum (e.g., a negative pressure), the vacuum seal assembly within the thief hatch is designed to break its seal to introduce pressure into the tank. When the pressure within the tank is between the upper and lower thresholds, the hatch is designed to maintain the seals of both the pressure and vacuum seal assemblies in sealing engagement with their respective sealing surfaces to substantially prevent any fluid from escaping the tank (e.g., substantially prevent leakage of vapor, fumes, and/or fluid from passing the seals).

The ability of a thief hatch to prevent leakage passing the seals within the hatch depends upon the sealing force applied to the seals. The pressure seal assembly of many known hatches includes a first seal (referred to herein as a pressure seal) that is urged against a first sealing surface based on a spring force generated by a first spring (referred to herein as a pressure spring). Similarly, the vacuum seal assembly of many known hatches includes a second seal (referred to herein as a vacuum seal) that is urged against a second sealing surface based on the spring force generated by a second spring (referred to herein as a vacuum spring).

The pressure and vacuum springs are designed with a strength or rating to counteract opposing forces on the respective pressure and vacuum seals produced by the pressure within the tank. More particularly, a vacuum (e.g., a negative pressure) in the tank will contribute to, rather than oppose, the sealing force of the pressure seal, while an over pressure will contribute to, rather than oppose, the sealing force of the vacuum seal. As such, the pressure spring is designed to counteract positive pressures up to the upper threshold before giving way to release the over pressure. Further, the vacuum spring is designed to counteract negative pressures down to the lower threshold before giving way to allow pressure into the tank to reduce the vacuum. Thus, the pressure seal assembly operates in one direction to maintain a tight seal until the tank pressure exceeds the upper threshold, and the vacuum seal assembly operates in the opposite direction to maintain a tight seal until the tank pressure falls below the lower threshold.

Prior to the pressure seal or the vacuum seal breaking when the tank pressure reaches the respective upper or lower threshold, it is desirable to have the seals urged as tightly as possible against their corresponding seal surfaces to reduce the amount of leakage. That is, it is desirable to have the sealing force for the seals to be as high as possible while still enabling the seals to break away when the corresponding thresholds are reached. While increasing the strength or rating of the springs would increase the sealing force for the associated seals, the increased spring forces may prevent the seals from releasing at the desired thresholds because greater pressure (or greater vacuum) within a tank would be need before the spring forces would be overcome.

Examples disclosed herein increase the sealing forces on the seals by increasing the amount of force contributed by the pressure in the tank acting on the seals in a direction that urges the seals in engagement with their respective sealing surfaces. In particular, the force produced by the tank pressure is increased by increasing the surface area on which the tank pressure acts to urge the seals in the direction of increased sealing engagement with their respective sealing surfaces. In some examples, the surface area is increased by including a diaphragm within a hatch that separates a chamber at a first pressure corresponding to the pressure of the tank from a second chamber at a second pressure corresponding to an ambient environment (e.g., atmospheric pressure).

FIG. 1 is a schematic of a storage tank system 100 having a tank 102 with an example thief hatch 104 mounted thereon. The storage tank system 100 may be a component of a variety of applications. Furthermore, while the tank 102 is described as a storage tank, the tank 102 may be any suitable fluid containing vessel used for any suitable purpose. In the illustrated examples, the tank 102 is coupled to an input device 106 that may pump, discharge, or otherwise introduce a fluid into the tank 102. Similarly, the tank 102 is coupled to an output device 108 to receive or withdraw fluid from the tank 102. The input and output devices 106, 108 may be any type of fluid handling, storage, and/or processing components or equipment that are operatively coupled to the tank 102 substantially permanently or on a selective, temporary, and/or intermittent basis.

When a fluid is stored in the tank 102, pressure may build within the tank 102. For example, the input device 106 may discharge the fluid for storage into the tank 102 at an elevated pressure. In some examples, it may be desirable to vent or release pressure within an interior 110 of the tank 102 that is above a threshold pressure (e.g., a high pressure threshold). As such, the tank 102 includes the thief hatch 104, which is configured to open (e.g., periodically open) fluid communication between the interior 110 of the tank 102 and an ambient environment 112 external to the tank 102. In particular, the thief hatch 104 may be configured to open fluid communication between the interior 110 of the tank 102 and the ambient environment 112 surrounding the tank 102 when the pressure within the interior 110 of the tank 102 exceeds an upper threshold pressure. In this manner, vapor, fumes, and/or fluid may be vented from the tank 102, thereby decreasing the internal pressure of the tank 102. Once the internal pressure of the tank 102 falls below the upper threshold pressure, the seal assembly of the thief hatch 104 may automatically close and re-seal, thereby blocking fluid communication between the interior 110 of the tank 102 and the ambient environment 112.

In some instances, pressure may decrease within the tank 102 to form a vacuum (e.g., a negative pressure relative to the ambient environment 112). For example, the output device 108 may pump fluid from the tank 102. In some examples, it may be desirable to reduce an excessive vacuum within the tank 102 by allowing fluid (e.g., air) from the ambient environment 112 to be introduced into the interior 110 of the tank 102 when the pressure is below a threshold pressure (e.g., a vacuum pressure threshold). As such, the thief hatch 104 may be configured to open (e.g., periodically open) fluid communication between the interior 110 of the tank 102 and an ambient environment 112 external to the tank 102 in a similar manner to that described above for excess pressure in the tank 102. Thus, in some examples, the thief hatch 104 regulates the pressure within the tank 102 to be within upper and lower thresholds. In some examples, the thief hatch 104 includes two different seal assemblies that cooperatively operate to selectively open or remain sealed at respective ones of the thresholds limiting the operating range of pressures maintained with the tank 102.

Figure 2:
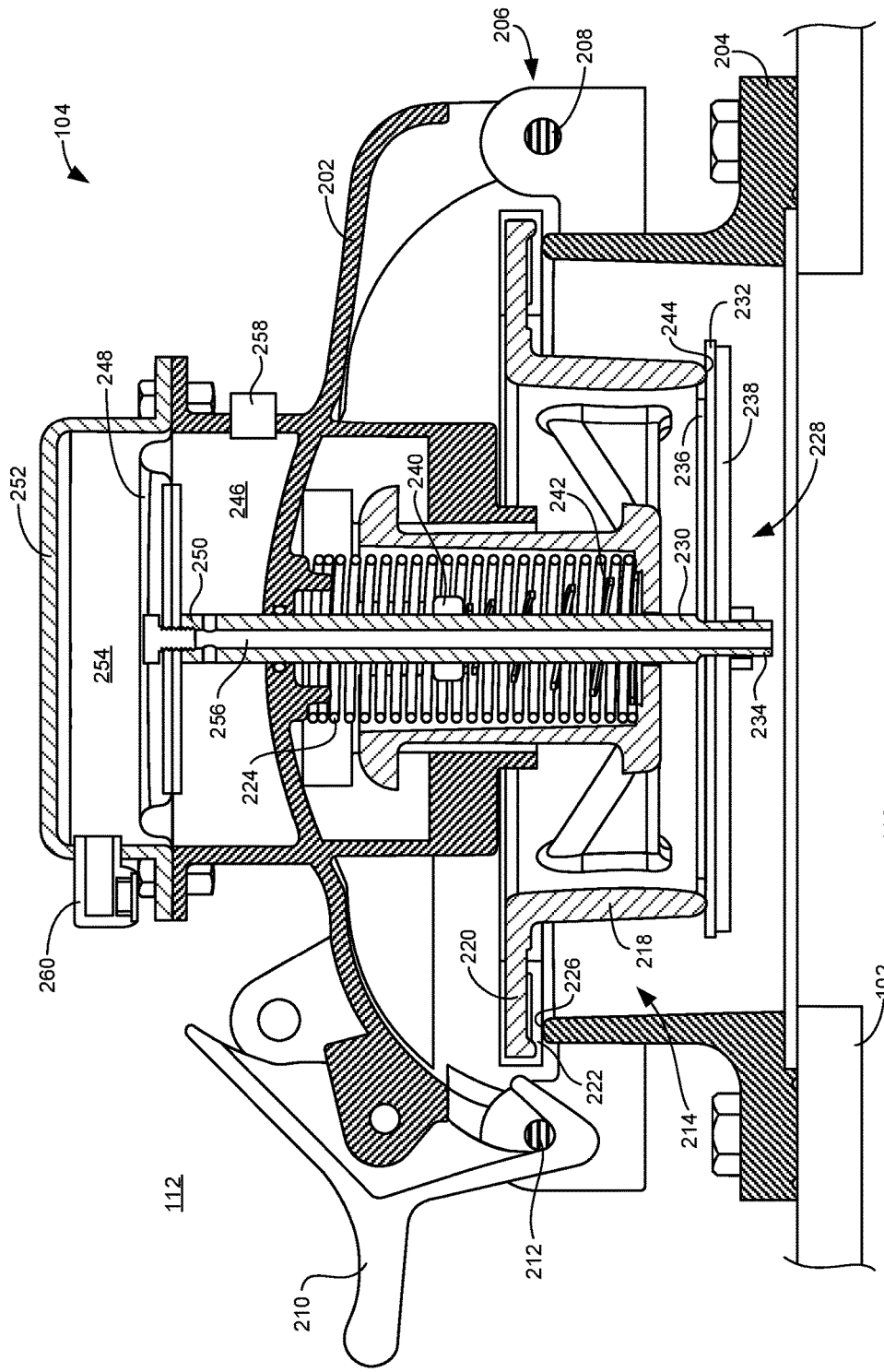
FIG. 2 is a cross-sectional view of the example thief hatch of FIG. 1.

FIG. 2 is a cross-section of the example thief hatch 104 mounted on the tank 102 of FIG. 1. The thief hatch 104 includes a lid or cover 202 and a base 204. As shown in the illustrated example, the cover 202 is pivotably coupled to the base 204 via a hinge 206 formed using a first pin 208 extending through both the cover 202, and the base 204. The cover 202 includes a latch 210 that hooks onto a second pin 212 on the base 204 to secure the cover 202 in a closed position. While a pin 212 is shown in FIG. 2, the latch 210 may hook onto any other suitable element attached to the base 204 (e.g., a ridge or protrusion integrally formed in the base 204).

In the illustrated example, a pressure seal assembly 214 is removably coupled to the cover 202. The example pressure seal assembly 214 includes a center body 218 with a flange 220 on which is attached a gasket or pressure seal 222. In some examples, the pressure seal 222 is a hollow seal with a generally c-shaped cross section to wrap around the flange 220. The example pressure seal assembly 214 also includes a pressure spring 224 positioned to urge the center body 218 away from the cover 202. As shown in the illustrated example, when the cover 202 is in the closed position, the pressure seal 222 abuts against a sealing surface 226 on the base 204 of the hatch 104. Therefore, as the pressure spring 224 urges the center body 218 of the pressure seal assembly 214 away from the cover 202, the pressure spring 224 urges the pressure seal 222 against the sealing surface 226. In this manner, a relatively tight seal between the base 204 and the pressure seal 222 is maintained until pressure within the tank 102 exceeds an upper threshold above an ambient pressure. When the tank pressure exceeds the upper threshold, the pressure seal 222 separates from the associated sealing surface 226 to release pressure within the interior 110 of the tank 102 past the seal 222 and out of the cover 202 to the ambient environment 112 exterior to the tank 102.

In the illustrated example of FIG. 2, the thief hatch 104 includes a vacuum seal assembly 228 that is operatively coupled to the pressure seal assembly 214. As shown in FIG. 2, the example vacuum seal assembly 228 includes a stem 230 that extends through the center body 218 of the pressure seal assembly 214. In the illustrated example, the stem 230 supports a gasket or vacuum seal 232 adjacent a first end 234 of the stem 230. The vacuum seal 232 is secured between a seal support 236 on one side of the vacuum seal 232 and a vacuum pallet disk 238 on the other side. In some examples, the vacuum seal 232 is a hollow seal.

In the illustrated example, a stop 240 is arranged to protrude from an outer diameter of the stem 230. As shown in the illustrated example, a vacuum spring 242 is positioned between the stop 240 and the center body 218 to urge the stem 230 upwards (from the perspective shown in FIG. 2) relative to the center body 218 of the pressure seal assembly 214. The upward movement of the stem 230 is limited by the vacuum seal 232 coming into contact with a sealing surface 244 on the center body 218. Thus, the vacuum spring 242 serves to urge the vacuum seal 232 against the sealing surface 244. In this manner, a relatively tight seal between the center body 218 and the vacuum seal 232 is maintained until pressure within the tank 102 drops below a lower threshold corresponding to a vacuum (e.g., a negative pressure relative to an ambient pressure). When the tank pressure is a vacuum below the lower threshold, the vacuum seal 232 separates from the associated sealing surface 244 to allow pressure to be introduced into the interior 110 of the tank 102 from the ambient environment 112 after flowing under the cover 202, through the center body 218, and past the vacuum seal 232. In the illustrated example, the seal support 236, the vacuum seal 232, and the vacuum pallet disk 238 are secured in place against a shoulder of the stem 230 via a nut.

As shown in FIG. 2, the cover 202 of the example thief hatch 104 defines a first chamber 246 that is enclosed by a diaphragm 248 coupled to second end 250 of the stem 230. The diaphragm 248 may be secured in place between the cover 202 and an actuator case or housing 252 defining a second chamber 254 on the opposite side of the diaphragm 248 to the first chamber 246. In the illustrated example, the stem 230 includes a bore 256 extending along a length of the stem 230 as a means for placing the interior 110 of the tank 102 in fluid communication with the first chamber 246. In this manner, the first chamber 246 is maintained at the pressure of the tank 102. In other examples, the interior 110 of the tank 102 may be placed in fluid communication with the first chamber 246 via tubing, piping, or any other suitable conduit. In some examples, the thief hatch 104 includes a gauge port 258 to enable monitoring of the pressure within the tank 102. As shown in the illustrated example, the gauge port 258 may be on the cover 202 adjacent the first chamber 246 that is maintained at the pressure of the tank 102.

Furthermore, in the illustrated example, the actuator housing 252 includes a vent 260 to place the second chamber 254 in fluid communication with the ambient environment 112 exterior to the tank 102. As a result, the vent 260 provides a means for maintaining an area (e.g., the second chamber 254) adjacent the diaphragm 248 at the pressure of the ambient environment 112 (e.g., atmospheric pressure).

In the illustrated example, a pressure differential between the first chamber 246 and the second chamber 254 produces a force urging the diaphragm 248 either (1) away from the tank 102 (when the tank pressure in the first chamber 246 is greater than the ambient pressure in the second chamber 254) or (2) towards the tank 102 (when the tank pressure in the first chamber 246 is less than the ambient pressure in the second chamber 254). The amount of force generated on the diaphragm 248 corresponds to the magnitude of the pressure differential multiplied by the surface area of the diaphragm 248.

Inasmuch as the stem 230 is coupled to the diaphragm 248, the resulting force acting on the diaphragm 248 at the second end of 250 of the stem 230 is translated along the stem 230 to the stop 240 acting on the vacuum spring 242 as well as the vacuum seal 232 at the first end 234 of the stem 230. The force on the seal 232 transferred from the diaphragm 248 is an additional force beyond that created by the pressure differential directly across the vacuum seal 232 (and associated seal support 236 and vacuum pallet disk 238). That is, in the illustrated example, the tank pressure acts on the surface areas associated with both the diaphragm 248 and the vacuum seal 232 to produce a larger force than is possible if the pressure were limited to acting only on the vacuum seal 232 directly. Thus, when the tank pressure is above the ambient pressure of the ambient environment 112, the force of pressure acting on the diaphragm 248 combines with the force of pressure acting on the seal 232 directly (along with the spring force from the vacuum spring 242) to urge the vacuum seal 232 away from the tank 102 and against the associated sealing surface 244. In other words, the diaphragm 248, with the bore 256 in the stem 230 placing the first chamber 246 in fluid communication with the tank 102, is a means for providing a larger surface area on which the tank pressure is applied to increase the sealing force of the vacuum seal 232 (when the tank pressure is greater than the ambient environment 112).

The additional sealing force urging the vacuum seal 232 against the sealing surface 244 on the center body 218 of the pressure seal assembly 214 will urge the center body 218 away from the tank 102, thereby reducing the sealing force urging the pressure seal 222 against the corresponding sealing surface 226 of the base 204. This may result in the pressure seal 222 opening prematurely to release pressure before a desired upper threshold is reached. Accordingly, in some examples, the additional force transferred to the pressure seal assembly 214 is compensated for by a stronger pressure spring 224. In this manner, a tighter seal for the vacuum seal 232 is achieved than is possible for other similar hatches without significantly impacting the threshold at which pressure may be released passed the pressure seal 222. Furthermore, the increased strength of the pressure spring 224 results in an increased sealing force between the pressure seal 222 and the associated sealing surface 226 when the tank pressure is below the pressure of the ambient environment 112.

When the tank 102 is at a negative pressure (e.g., is in a vacuum state) relative to the ambient environment 112, the pressure differential across the diaphragm 248 produces an additional force urging the vacuum seal 232 towards the tank 102 and away from the associated sealing surface 244. As with the pressure seal assembly 214, this additional force may cause the vacuum seal 232 to separate from the sealing surface 244 prematurely to allow pressure into the tank before the lower threshold is reached. Accordingly, in some examples, the additional force transferred to the vacuum seal 232 is compensated for by a stronger vacuum spring 242. In this manner, a tighter seal for the vacuum seal 232 is achieved at tank pressures above the lower threshold while still enabling pressure to be introduced into the tank when the tank pressure drops below the lower threshold.

Figure 3:
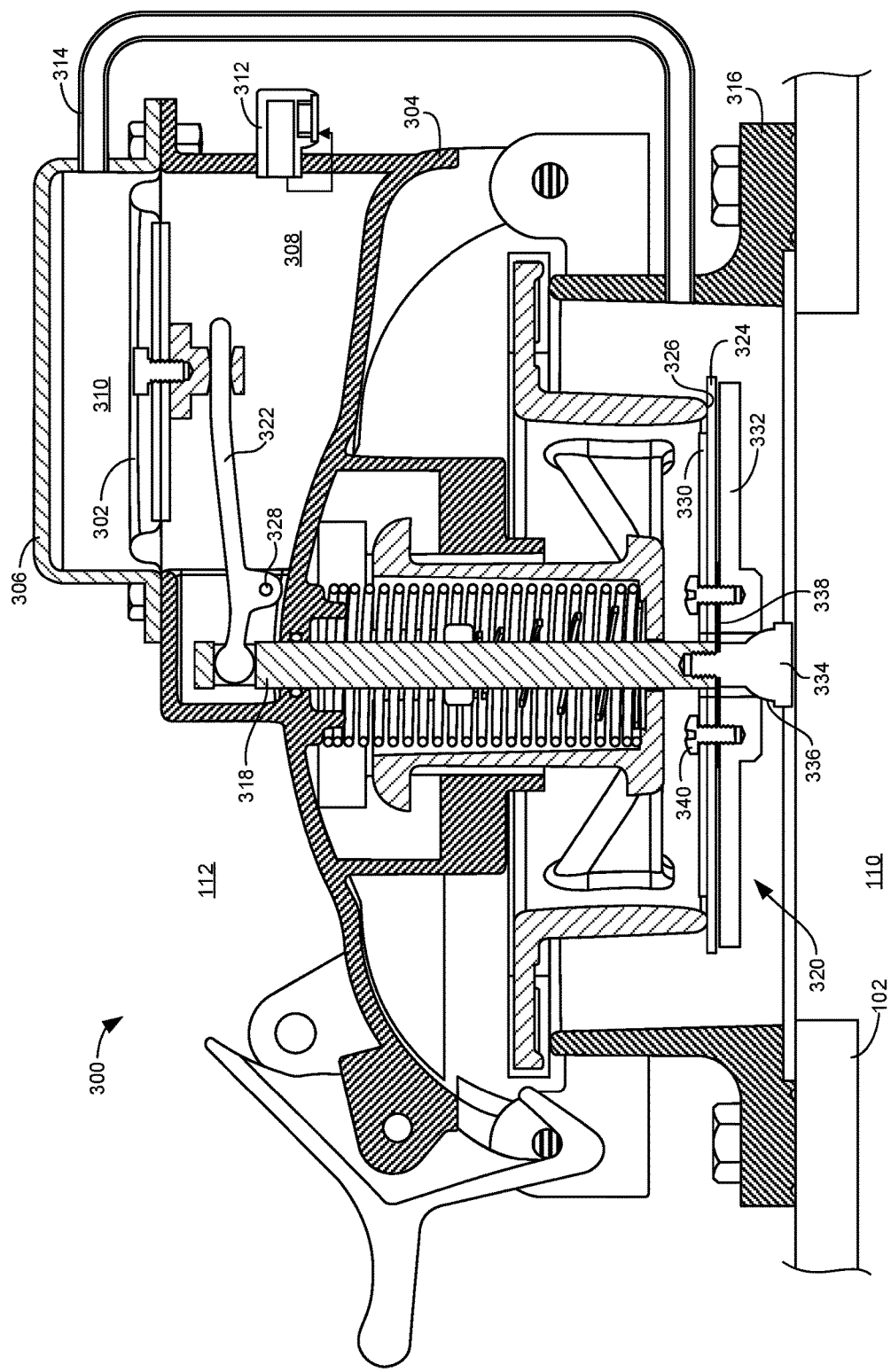
FIG. 3 is a cross-sectional view of another example thief hatch.

FIG. 3 is a cross-sectional view of another example thief hatch 300 that may be mounted to the tank 102 of FIG. 1. Similar to the hatch 104 shown in FIG. 2, the example hatch 300 shown in FIG. 3 includes a diaphragm 302 secured between a cover 304 of the hatch 300 and an actuator housing 306. The diaphragm 302 separates a first chamber 308 within the cover 304 from a second chamber 310 within the actuator housing. In the illustrated example, the cover 304 includes a vent 312 to place the first chamber 308 in fluid communication with the ambient environment 112 exterior to the tank 102. As a result, the vent 312 provides a means for maintaining an area (e.g., the first chamber 308) adjacent the diaphragm 302 at the pressure of the ambient environment 112 (e.g., atmospheric pressure). Further, in the illustrated example, a flexible tube 314 or other suitable conduit extends from the actuator housing 306 to a base 316 of the hatch 300 to place the interior 110 of the tank 102 in fluid communication with the second chamber 310. In this manner, the second chamber 310 is maintained at the pressure of the tank 102.

A pressure differential across the diaphragm 302 results from a difference in pressure between the first chamber 308 (maintained at the pressure of the ambient environment 112) and the second chamber 310 (maintained at the pressure of the tank 102). In the illustrated example, a pressure differential arising from an over pressure within the tank 102 produces a force urging the diaphragm 302 towards the tank 102. This is the opposite direction of movement to the diaphragm 248 of FIG. 1 in over pressure conditions. However, as shown in the illustrated example of FIG. 3, the movement of the diaphragm 302 is translated to a stem 318 of a vacuum seal assembly 320 via a lever 322. The lever 322 urges the stem 318 in the opposite direction to the diaphragm 302. As a result, when the diaphragm 302 is urged towards the tank 102 (when the tank pressure is greater than the ambient pressure (e.g., an over pressure)), the stem 318 is urged away from the tank 102. The stem 318, in turn, urges a vacuum seal 324 of the vacuum seal assembly 320 away from the tank 102, thereby contributing to the sealing force used to engage the vacuum seal 324 with the associated sealing surface 326.

Similar to the diaphragm 248 of FIG. 2, the amount of force generated on the diaphragm 302 of FIG. 3 corresponds to the magnitude of the pressure differential between the first and second chambers 308, 310 multiplied by the surface area of the diaphragm 302. In FIG. 2, this force directly corresponds to the force transferred to the vacuum seal 232. However, unlike FIG. 2, the force transferred to the vacuum seal 324 of FIG. 3 from the diaphragm 302 is different than the pressure force acting on the diaphragm 302 because of the lever 322. That is, based on the location of the rotation point or fulcrum 328 of the lever 322, the force generated by the diaphragm 302 may be magnified to produce a greater sealing force at the vacuum seal 324. The fulcrum 328 may be positioned at any suitable location along the lever 322 to define the resulting amount of force that contributes to the sealing force of the vacuum seal 324.

In the illustrated example of FIG. 3, the vacuum seal 324 is secured between a seal support 330 on one side of the vacuum seal 324 and a vacuum pallet disk 332 on the other side. In some examples, the vacuum seal 324 is a hollow seal. In some examples, the vacuum seal 324 (and the associated seal support 330 and vacuum pallet disk 332) is connected to the stem 318 using a flexible or swivel joint (e.g., a ball joint) to facilitate and/or improve the sealing engagement of the vacuum seal 232 against the sealing surface 244 on the center body 218. In particular, as shown in the illustrated example, the vacuum seal assembly 320 includes a ball attachment 334 that is includes a spherical surface 336 that interfaces with the vacuum pallet disk 332 to enable the disk 332 to swivel or change orientation. A sealing membrane 338 is positioned between the vacuum pallet disk 332 and the vacuum seal 324 and dimensioned to be secured between a shoulder on the ball attachment 334 and the end of the stem 318 when the ball attachment 334 is attached (e.g., via threads) to the stem 318. Further, the sealing membrane 338 is clamped between the vacuum pallet disk 332 and the vacuum seal 324 via screws 340 extending therethrough.

While different example thief hatches 104, 300 have been shown and described in FIGS. 2 and 3, many variations to the disclosed structures may be implemented in accordance with the teachings disclosed herein. For example, while a flexible joint for the vacuum seal assembly 320 is shown in FIG. 3, a similar joint could alternatively be implemented for the vacuum seal assembly 228 of FIG. 2. A difference would be that the ball attachment may include a bore that aligns with the bore 256 in the stem 230 of FIG. 2. Likewise, the fixed joint for the vacuum seal assembly 228 shown in FIG. 2 could be implemented in the thief hatch 300 of FIG. 3. Further, the flexible tube 314 shown in FIG. 3 may implemented in the thief hatch 104 of FIG. 2 to place the interior 110 of the tank 102 in fluid communication with the first chamber 246 instead of relying on the bore 256.

From the foregoing, it will be appreciated that the above disclosed apparatus improve the sealing of pressure and vacuum seal assemblies inside a thief hatch while at pressures within upper and lower threshold pressures while still enabling the relief of pressure or vacuum at desired threshold pressures.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a base attachable to a tank;
a cover attached to the base via a hinge; and
a vacuum seal assembly couplable to the cover;
a diaphragm coupled to a stem of the vacuum seal assembly, the diaphragm moveable in response to a pressure differential between a first pressure within the tank and a second pressure exterior to the tank; and
an actuator housing coupled to the cover, the diaphragm secured between the cover and the actuator housing to separate a first chamber within the actuator housing from a second chamber within the cover.

2. The apparatus of claim 1, wherein the vacuum seal assembly is to urge a vacuum seal into sealing engagement with a sealing surface when the first pressure is above a vacuum pressure threshold.

3. The apparatus of claim 2, further including a pressure seal assembly couplable to the cover, the pressure seal assembly to urge a pressure seal against the base, the pressure seal assembly including the sealing surface against which the vacuum seal is urged, the vacuum seal assembly to urge the vacuum seal against the pressure seal assembly via a spring force.

4. The apparatus of claim 3, wherein the diaphragm produces an additional force that combines with the spring force to urge the vacuum seal against the pressure seal assembly when the first pressure is greater than the second pressure.

5. The apparatus of claim 4, further including a pressure spring to urge the pressure seal against the base, the pressure spring to overcome the combination of the spring force and the additional force.

6. The apparatus of claim 1, wherein the actuator housing includes a vent to place the first chamber in fluid communication with an exterior environment.

7. The apparatus of claim 1, wherein the cover includes a vent to place the second chamber in fluid communication with an exterior environment.

8. The apparatus of claim 1, wherein the first pressure within the tank is provided to the second chamber from the tank via a bore extending along a length of the stem.

9. The apparatus of claim 1, wherein the first pressure within the tank is provided to the first chamber from the tank via a tube extending between the base and the actuator housing.

10. The apparatus of claim 1, wherein the diaphragm is coupled to the stem via a lever.

11. The apparatus of claim 1, wherein the vacuum seal is coupled to the stem via a flexible joint.

12. An apparatus, comprising:
a base attachable to a tank;
a cover pivotably coupled to the base via a hinge;
an actuator housing coupled to the cover; and
a diaphragm disposed between the actuator housing and the cover, the diaphragm separating a first chamber within the actuator housing from a second chamber within the cover, a pressure differential between a first pressure in the first chamber and a second pressure in the second chamber to produce a force urging a vacuum seal against a sealing surface.

13. The apparatus of claim 12, wherein the force from the pressure differential combines with a spring force from a vacuum spring to urge the vacuum seal against the sealing surface.

14. The apparatus of claim 12, further including a vent on the actuator housing to maintain the first pressure at an ambient pressure surrounding the tank.

15. The apparatus of claim 12, wherein the second pressure corresponds to a tank pressure within the tank.

16. The apparatus of claim 12, further including a stem, the diaphragm coupled to the stem proximate a first end of the stem, the vacuum seal coupled to the stem proximate a second end of the stem opposite the first end.

17. The apparatus of claim 16, wherein the stem includes a bore extending along a length of the stem to place the second chamber in fluid communication with the tank.

18. An apparatus, comprising:
a base of a thief hatch attachable to a tank;
a cover of the thief hatch attached to the base via a hinge;
a vacuum seal disposed within the thief hatch, the vacuum seal to be urged against a sealing surface with a sealing force that includes a pressure force generated from a first pressure in the tank when the first pressure is above a second pressure in an ambient environment exterior to the tank, the vacuum seal to let pressure into the tank from the ambient environment when a tank pressure is less than a vacuum pressure threshold; and
means for providing a larger surface area on which the first pressure is applied to increase the sealing force.

19. The apparatus of claim 18, further including:
a stem, the vacuum seal coupled to the stem proximate a first end of the stem, wherein the means for providing the larger surface area includes a diaphragm coupled to the stem proximate a second end of the stem, a first side of the diaphragm enclosing a chamber within the cover of the thief hatch; and
means for placing the chamber in fluid communication with an interior of the tank.

20. The apparatus of claim 19, further including means for maintaining an area adjacent a second side of the diaphragm at the second pressure.

* * * * *